US012660790B2

(12) United States Patent
Gosselin et al.

(10) Patent No.: US 12,660,790 B2
(45) Date of Patent: Jun. 23, 2026

(54) MANURE HANDLING SYSTEM FOR USE IN BARNS

(71) Applicants: Christian Gosselin, Mirabel (CA); Alain Clavet, Mirabel (CA)

(72) Inventors: Christian Gosselin, Mirabel (CA); Alain Clavet, Mirabel (CA)

( * ) Notice: Subject to any disclaimer, the term of this patent is extended or adjusted under 35 U.S.C. 154(b) by 0 days.

(21) Appl. No.: 18/593,925

(22) Filed: Mar. 3, 2024

(65) Prior Publication Data

US 2025/0275515 A1 Sep. 4, 2025

(51) Int. Cl.
*A01K 1/01* (2006.01)
*A01C 3/04* (2006.01)

(52) U.S. Cl.
CPC .............. *A01K 1/0135* (2013.01); *A01C 3/04* (2013.01)

(58) Field of Classification Search
USPC ........ 119/161, 442, 447, 450, 451, 458, 479
See application file for complete search history.

(56) References Cited

U.S. PATENT DOCUMENTS

| | | | | |
|---|---|---|---|---|
| 1,774,326 A | | 8/1930 | Holmes .................... | A47L 15/39 |
| | | | | 15/93.1 |
| 2,836,310 A | * | 5/1958 | Schmitz ................... | A01K 1/01 |
| | | | | 414/605 |
| 3,263,257 A | * | 8/1966 | Stapleton, Sr. ........ | A01K 31/04 |
| | | | | 15/84 |

| | | | | |
|---|---|---|---|---|
| 3,721,214 A | * | 3/1973 | Staples ................... | A01K 31/04 |
| | | | | 414/389 |
| 6,761,413 B1 | * | 7/2004 | Mathews .................. | B60P 1/16 |
| | | | | 298/22 AE |
| 8,746,434 B2 | * | 6/2014 | Neufeld ............... | A01C 15/003 |
| | | | | 198/312 |
| 9,770,008 B2 | | 9/2017 | Clark ...................... | A01K 1/015 |
| 2008/0035763 A1 | * | 2/2008 | Dahlgren ............... | A01C 3/066 |
| | | | | 239/651 |
| 2010/0019072 A1 | * | 1/2010 | Nuhn ........................ | A01C 3/04 |
| | | | | 239/677 |
| 2017/0215371 A1 | * | 8/2017 | Fransen ................... | B30B 9/20 |

FOREIGN PATENT DOCUMENTS

| | | | | |
|---|---|---|---|---|
| CA | 2512792 A1 | * | 1/2006 | ............ A01B 63/00 |
| CN | 201640178 | | 11/2010 | ............ A01K 31/04 |
| CN | 202316440 | | 7/2012 | ............ B08B 9/08 |
| CN | 204907456 | | 12/2015 | ............ A01K 1/01 |
| CN | 106069813 | * | 11/2016 | ............ A01K 1/01 |

(Continued)

*Primary Examiner* — Andrea M Valenti

(57) ABSTRACT

The present invention provides a manure handling cart that includes a bin to collect manure and a first conveyor belt to transfer manure into the bin. The cart includes a bin to collect manure and wheels with an electric motor for propulsion. A first conveyor belt mounts to the cart to convey manure into the bin. The bin has a bottom opening and second conveyor belt to discharge manure. The first conveyor belt has four configurations: manure pickup resting on the floor, manure discharge from the second belt, centered storage, and side not in use. The first conveyor belt is mounted to an articulated frame that slides and pivots to adjust the first conveyor belt configuration. A piston pivots the frame at pivot points to configure the first belt. Brackets secure the first conveyor belt in the side storage and centered storage configurations.

13 Claims, 6 Drawing Sheets

(56)           References Cited

FOREIGN PATENT DOCUMENTS

| CN | 106900571 | * | 6/2017 | ............... | A01K 1/01 |
| CN | 105519454 |   | 8/2018 | ............. | A01K 31/04 |
| CN | 110150158 | * | 8/2019 | ............. | A01K 1/01 |
| CN | 110235789 | * | 9/2019 | ............. | A01K 1/01 |
| CN | 217576866 |   | 10/2022 | ............ | Y02A 40/90 |
| KR | 20210004384 | * | 1/2021 | ............ | A01K 31/04 |

* cited by examiner

MANURE HANDLING SYSTEM FOR USE IN BARNS

CROSS-REFERENCE TO RELATED APPLICATIONS

N/A

BACKGROUND OF THE INVENTION

1. Field of the Invention

The present invention relates generally to horse husbandry but more particularly to a manure handling system for use in barns.

2. Description of Related Art

Maintaining the cleanliness of horse stalls is essential for animal health and hygiene, requiring the periodic removal of manure and contaminated bedding. Traditionally, this task has been performed manually, involving a labor-intensive and step-by-step process.

Initially, workers use pitchforks to sift through the bedding, separating and removing manure deposits from the stall floor. This waste is then transported to a disposal site using wheelbarrows, which are filled and manually pushed from the stalls to the designated dumping area.

Following the removal of waste, it is necessary to replenish the stall with fresh bedding material, such as wood shavings, to ensure a clean and comfortable environment for the horses. This bedding is often transported and spread within the stall using the same wheelbarrows, adding to the workload.

The traditional method of stall cleaning, relying on pitchforks and wheelbarrows, is not only time-consuming but also physically strenuous. There exists a significant need for a more efficient and less labor-intensive solution for cleaning horse stalls and managing waste. Consequently, the invention described herein introduces a novel system for stall maintenance, offering an improved approach to manure removal and stall preparation.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a main object of the present invention to provide for a manure handling system for use in barns.

In order to do so, a manure cart handling system is provided, comprising a frame including two side panels and two end panels defining a bin for collecting manure; a first conveyor belt for transferring manure into the bin; a set of caster wheels attached to the frame for mobility; a steering mechanism connected to the set of caster wheels; and, a second conveyor belt positioned beneath an opening in the bottom of the bin for discharging manure from the bin.

In one embodiment, an articulated frame supporting the first conveyor belt is provided, capable of sliding and pivoting to adjust the position of the first conveyor belt relative to the bin. In another embodiment, the first conveyor belt is adjustable between a manure pickup configuration, a manure disposal configuration, a centrally located storage configuration, and a not in use side configuration. In one embodiment, the first conveyor belt is powered by an electric motor drawing power from a battery. In one embodiment, the second conveyor belt is powered by a combination electric motor and gearbox. In yet another embodiment, a piston and torsion spring mechanism is provided to facilitate the movement and stabilization of the articulated frame. In one embodiment, the system is configured to also transport and unload new bedding into stalls using the first conveyor belt for loading the bedding into the bin and the second conveyor belt for unloading the bedding into the stalls.

In another aspect of the invention, a manure cart handling system is provided, comprising a frame including two side panels and two end panels defining a bin for collecting manure, wherein at least one side panel of the two side panels is pivotally openable for discharging manure from the bin; a set of caster wheels attached to the frame for mobility; and, a steering mechanism connected to the set of caster wheels.

In one embodiment, a pair of side panel pistons and pivot arms for the operation of the pivotally openable side panel are provided. In one embodiment, hydraulic or pneumatic actuators are configured to assist in opening the at least one pivotally openable side panel. In one embodiment, the system is configured to also transport and unload new bedding into stalls using the pivotally openable side panel for loading and unloading the bedding into the stalls.

The foregoing has outlined rather broadly the more pertinent and important features of the present invention so that the detailed description of the invention that follows may be better understood and so that the present contribution to the art can be more fully appreciated. Additional features of the invention, which will be described hereinafter, form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE DRAWINGS

Other features and advantages of the present invention will become apparent when the following detailed description is read in conjunction with the accompanying drawings, in which.

DETAILED DESCRIPTION OF THE INVENTION

Figure 1:
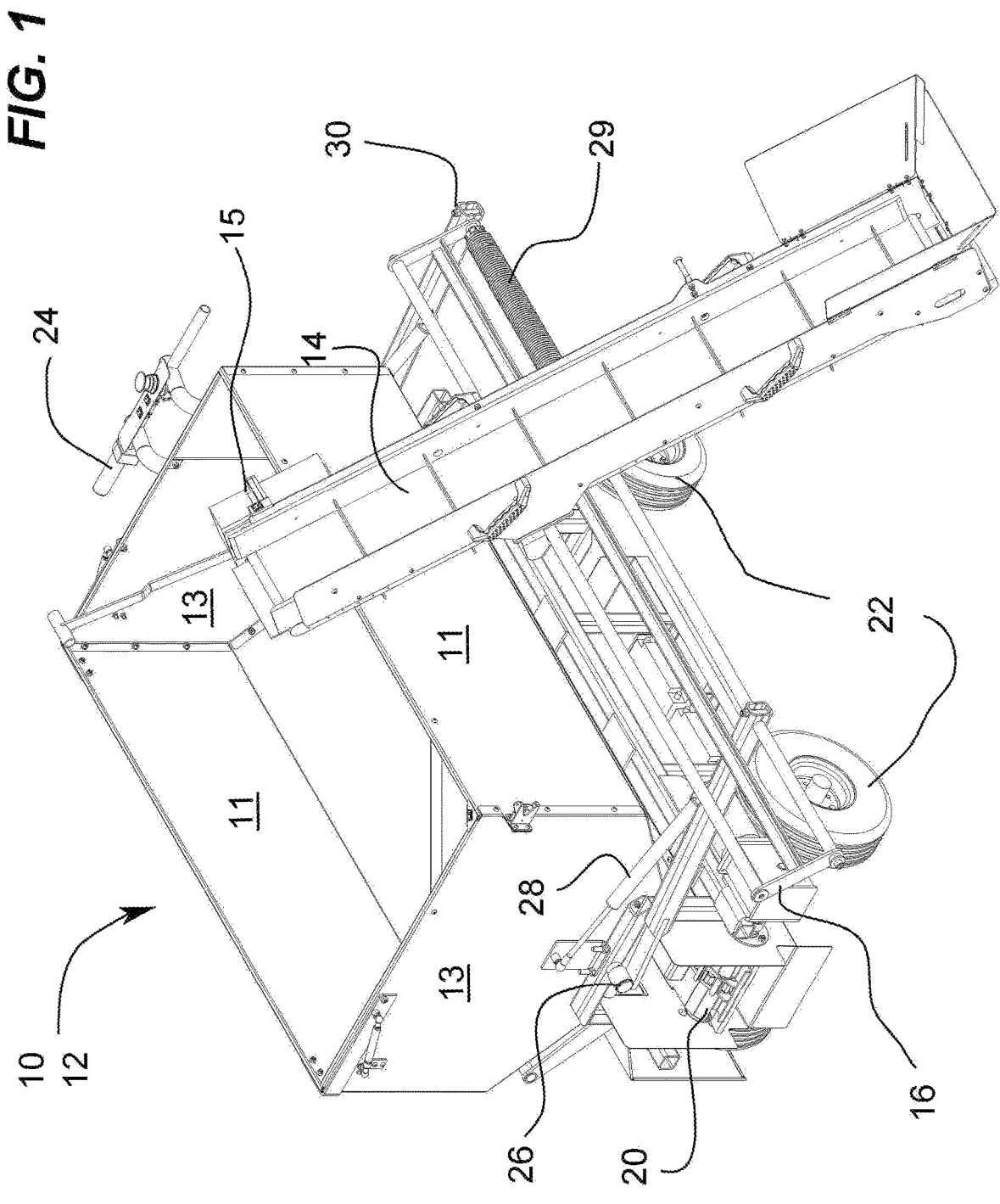
FIG. 1 is an isometric view of the manure handling system according to an embodiment of the present invention.
Figure 2:
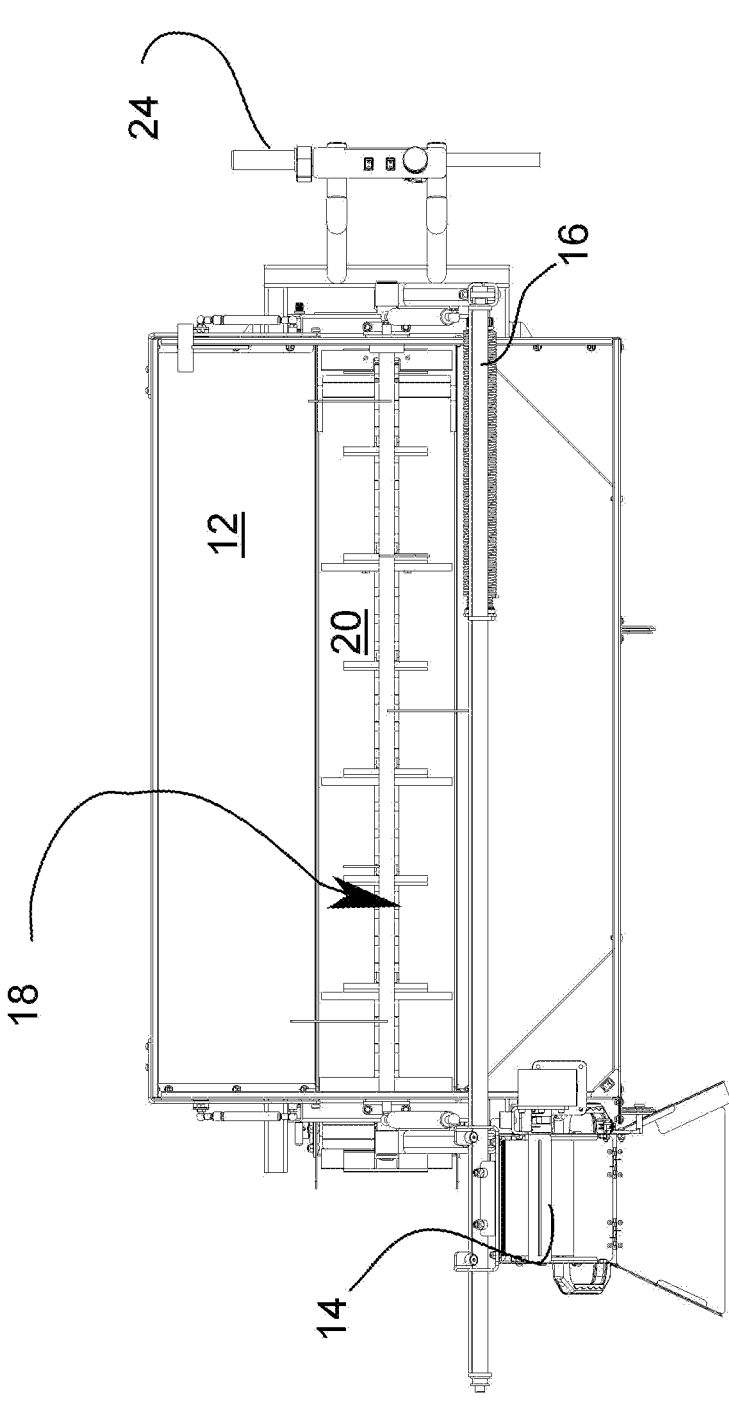
FIG. 2 is a top view of the manure handling system according to an embodiment of the present invention.
Figure 3:
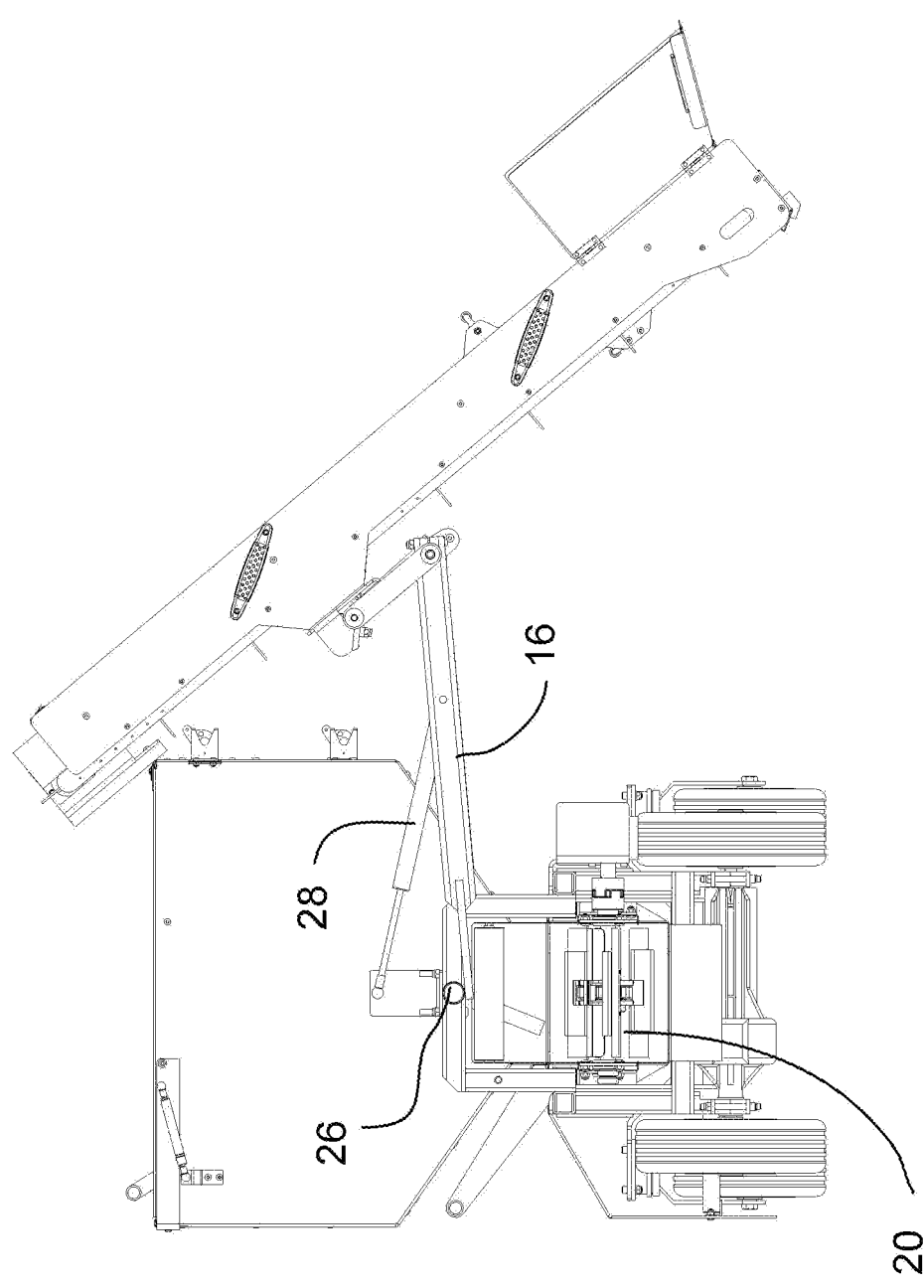
FIG. 3 is a side view of the manure handling system with the first conveyor in a first position defining a manure pickup configuration according to an embodiment of the present invention.
Figure 4:
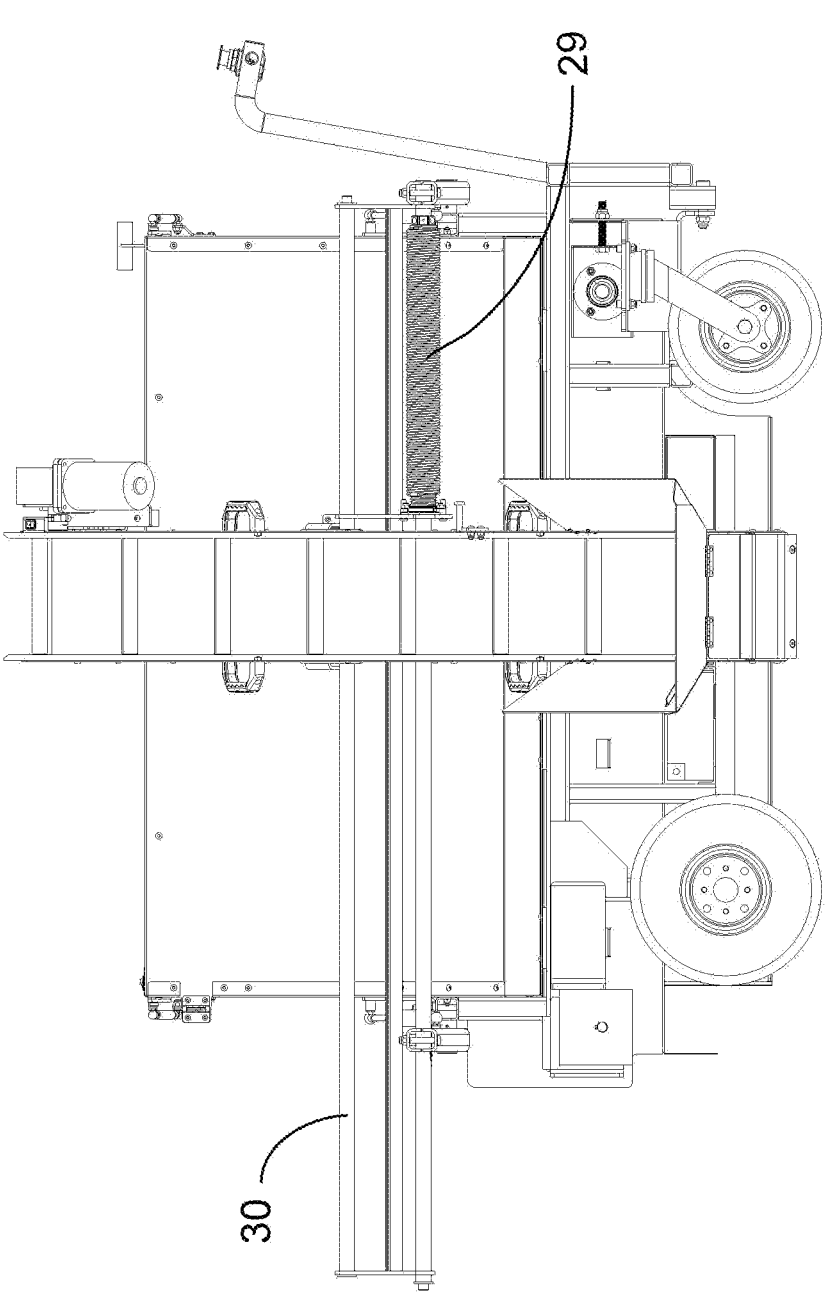
FIG. 4 is a front view of the manure handling system with the first conveyor in a central storage position according to an embodiment of the present invention.
Figure 5:
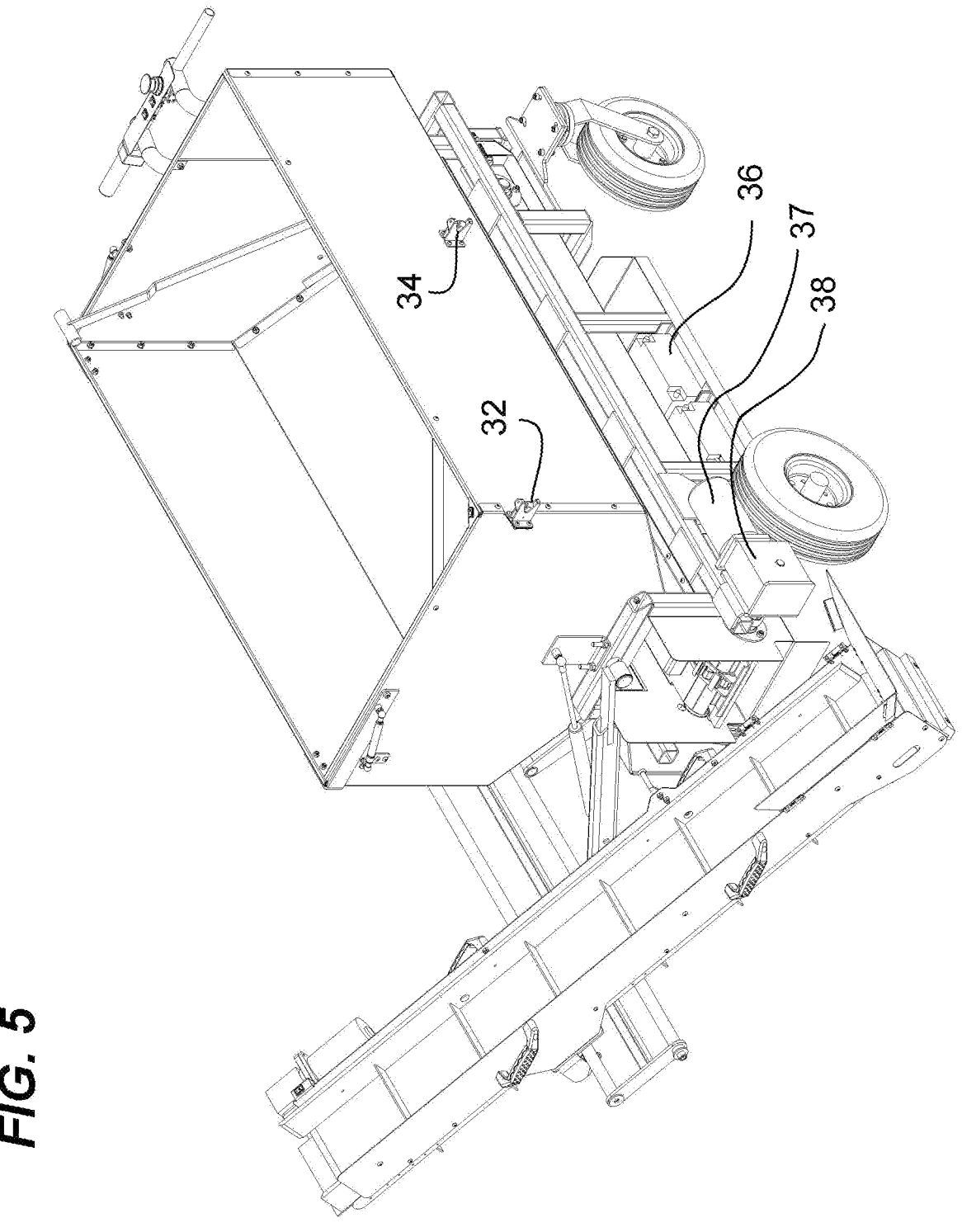
FIG. 5 is an isometric view of the manure handling system with the first conveyor positioned to take manure from the second conveyor according to an embodiment of the present invention.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a manure handling system for use in barns.

It is to be understood that the terminology used herein is for the purpose of describing particular embodiments only and is not intended to be limiting. The terms "a" or "an," as used herein, are defined to mean "at least one." The term "plurality," as used herein, is defined as two or more. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. These terms generally refer to a range of numbers that one of skill in the art would consider equivalent to the recited values (i.e., having the same function or result). In many instances these terms may include numbers that are rounded to the nearest significant figure.

Referring to any of the accompanying figures FIG. 1-5, the present invention includes a self-propelled manure cart 10 designed to improve the way manure and soiled bedding are handled in horse stalls. Advantageously, the manure cart 10 incorporates a seamless blend of functionality and efficiency through its structural and operational features which will be described in further details below.

In some embodiments, the cart 10 is constructed with robust side panels 11 and end panels 13, arranged perpendicularly to each other defining bin 12, wherein the bin is square or rectangular in shape. The bin 12 is central to the cart's purpose, serving as the collection point for manure. Mobility is a critical aspect of the cart's design, achieved through a set of caster wheels 22, ensuring easy navigation across various terrains found within a farm, barn, or stable environment. In some embodiments, the side panels may be arranged in a variety of shapes and arrangements defining the bin, including but not limiting to a parallelogram, rhombus, oval, circular, quadrilateral or similar.

In one embodiment, the cart 10 comprises a first conveyor belt 14, engineered to convey manure from the ground into the bin 12 efficiently. In one embodiment, the first conveyor belt 14 is driven by a geared electric motor 15, which is powered by a battery 36. The electric motor can be connected to a gear box, as known in the art. Additionally, the cart 10 comprises a second conveyor belt 20 located beneath the bin's opening 18. The second conveyor belt 20 is also powered by a combination electric motor 37 and gearbox 38, wherein the second conveyor belt 20 is tasked with transporting the collected manure outside the cart, facilitating effortless disposal. More specifically, the second conveyor belt 20 transports manure discharged from the bin 12 to an area external to the cart 10.

In some embodiments, to maneuver the cart, a steering mechanism 24 is connected to the wheels 22, allowing for precise control and steering, which is essential for navigating through the confined spaces of barns and stables.

Advantageously, the configuration of the first conveyor belt 14 is engineered for maximal versatility and adaptability. In some embodiments, the first conveyor belt 14 is adapted to be configured into four different positions to suit various operational needs, such as manure pickup, disposal, central storage, and a side not-in-use position. More specifically, the first conveyor belt may be positioned in a first position a manure pickup configuration with the belt resting on the stall floor to receive manure, a second position defined as a manure disposal configuration with the belt positioned to discharge manure from the second conveyor 20, a central storage position wherein the first conveyor belt 14 is positioned in the center of the bin, and finally a not in use side configuration with the first conveyor belt 14 raised and secured along one of the side panels 11.

This flexibility and versatility of the first conveyor belt 14 is made possible through an articulated frame 16, which can slide and pivot, allowing the first conveyor belt 14 to be extended, retracted, or swung into the desired configuration. A piston 28, along with a torsion spring 29, facilitates this movement, ensuring the first conveyor belt 14 is securely positioned for each task.

In some embodiments, support brackets 32 and 34 are incorporated to stabilize the first conveyor belt 14 in its side not-in-use and central storage configurations, ensuring that the first conveyor belt 14 remains fixed during transportation or when the cart is stationary.

Figure 6:
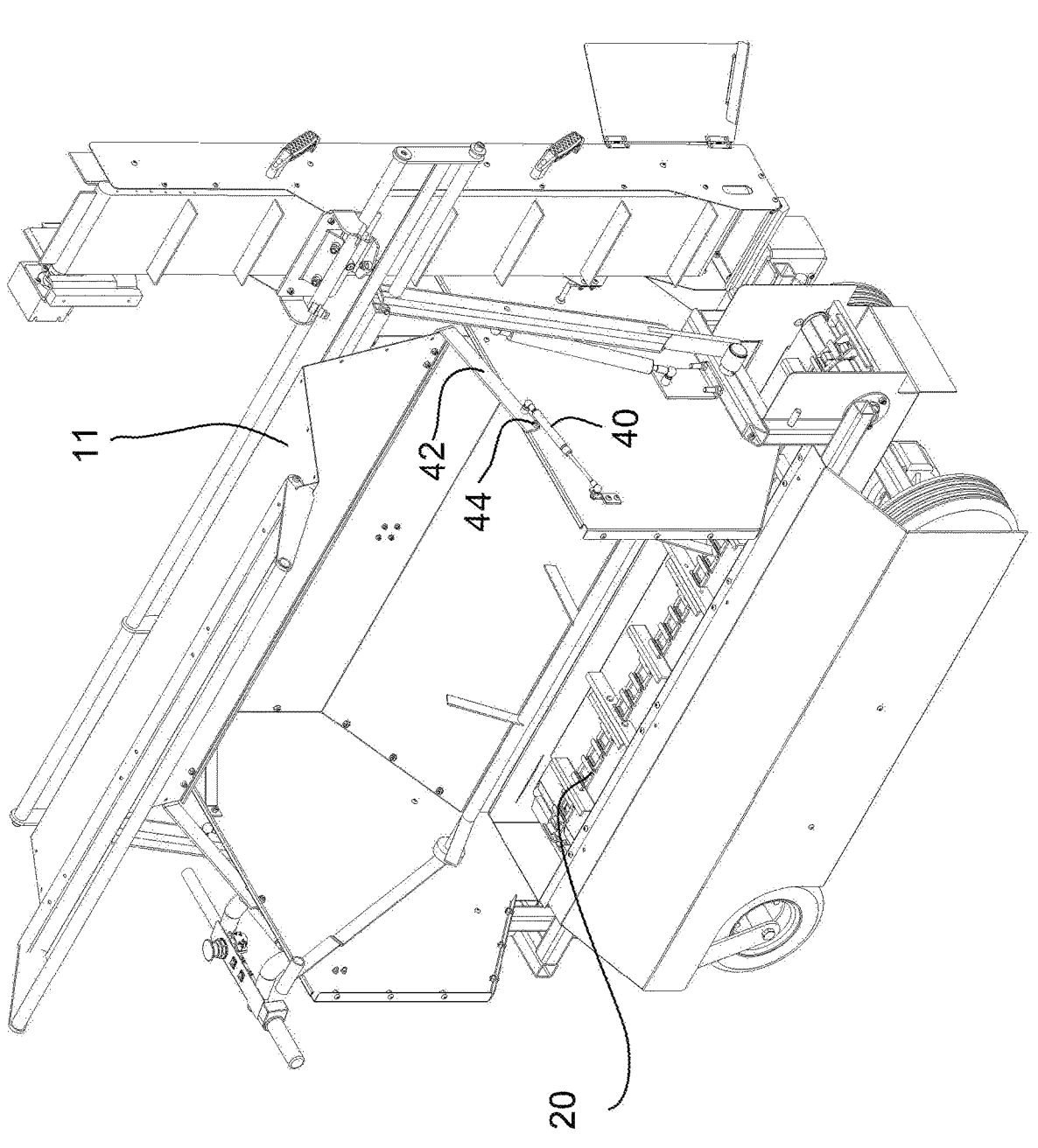
FIG. 6 is an isometric view of the manure handling system with the first conveyor in a lateral storage position and a side panel pivotally open and lifted up over the bin according to an embodiment of the present invention.

Best seen in FIG. 6, in an alternative embodiment, the cart 10 introduces an innovative feature where one of the side panels 11 is designed to open pivotally. This design, facilitated by side panel pistons 40 and pivot arms 42, allows for direct discharge of the manure without the need for conveyor belts, offering a simpler and potentially more economical option for users. In this alternate embodiment, once the side panel 11 is opened, the manure slides outside of the bin 12. The operator can use a shovel to finish emptying. In this way, the second conveyor 20 is not necessary, and could make this model lighter and more economical.

Furthermore, in some embodiments, the cart's utility extends beyond manure handling. It is also adept at transporting and unloading fresh bedding into the stalls, utilizing the conveyor belt system to streamline this essential task. For example, the new bedding is first loaded into bin 12 with the first belt conveyor 14. The bedding is then transported with the cart 10 to the stalls and unloaded into the stalls using the belt conveyors 14, 20.

In essence, this invention presents a comprehensive solution for stall maintenance, combining a self-propelled cart with a versatile conveyor system. It not only significantly reduces the physical labor associated with manure and bedding management but also enhances operational efficiency in horse stall maintenance.

Although the invention has been described in considerable detail in language specific to structural features, it is to be understood that the invention defined in the appended claims is not necessarily limited to the specific features described. Rather, the specific features are disclosed as exemplary forms of implementing the claimed invention. The terminology and phraseology used in this description and the abstract are for illustrative purposes and should not be considered as limiting. In other words, the terminology and phraseology used in this description and the abstract are for illustrative purposes and should not be considered limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to "first," "second," "third," and so fourth members throughout the disclosure (and in particular, claims) are not used to show a serial or numerical limitation but instead are used to distinguish or identify the various members of the group.

What is claimed is:

1. A manure cart handling system comprising:
   a cart including two side panels and two end panels defining a manure collection bin for collecting unprocessed manure;
   a first conveyor belt system for transferring unprocessed manure directly into the bin, the first conveyor belt system comprising an articulated frame extending parallel to the side panels and a first conveyor belt supported by the articulated frame;
   a set of caster wheels attached to the cart for stability;
   a steering mechanism connected to the set of caster wheels; wherein the steering mechanism is at one end of the cart and an unprocessed manure discharge end is at an opposite end of the cart;
   a second conveyor belt positioned beneath an opening in a bottom of the bin for discharging unprocessed manure from the bin for external disposal; wherein the articulated frame is configured to slide and pivot to allow the first conveyor belt system to be extended, retracted, and swung into different configurations; and
   wherein the different configurations include a manure pickup configuration wherein the first conveyor belt is positioned to collect manure from a barn floor, a manure disposal configuration wherein the first conveyor belt is positioned to receive manure from the second conveyor belt at the discharge end of the cart, a centrally located storage configuration, and a side storage configuration.

2. The system of claim 1, wherein the first conveyor belt system is powered by an electric motor drawing power from a battery.

3. The system of claim 1, wherein the second conveyor belt is powered by a combination electric motor and gearbox.

4. The system of claim 1, wherein the articulated frame comprises a piston and torsion spring mechanism configured to facilitate movement of the articulated frame between the different configurations.

5. The system of claim 1, wherein the system is configured to also transport and unload new bedding into stalls using the first conveyor belt system for loading the bedding into the bin and the second conveyor belt for unloading the bedding into the stalls.

6. The system of claim 1, wherein at least one side panel of the two side panels is pivotally openable for discharging unprocessed manure from the bin.

7. The system of claim 6, further comprising a pair of side panel pistons and pivot arms for the operation of the pivotally openable side panel.

8. The system of claim 7, wherein hydraulic or pneumatic actuators are configured to assist in opening the at least one pivotally openable side panel.

9. The system of claim 6, wherein the system is configured to also transport and unload new bedding into stalls using the pivotally openable side panel for loading and unloading the bedding into the stalls.

10. The system of claim 1, further comprising support brackets configured to stabilize the first conveyor belt system in at least one of the centrally located storage configuration and the side storage configuration.

11. The system of claim 1, wherein sliding and pivoting of the articulated frame allows lateral swinging movement and extension or retraction movement of an outlet end of the first conveyor belt system relative to an inlet end of the first conveyor belt system.

12. The system of claim 1, wherein the caster wheels allow omnidirectional movement of the manure cart.

13. The system of claim 1, wherein the articulated frame is configured such that the first conveyor belt system can be positioned in each of the different configurations without disassembly of components.

* * * * *